(12) United States Patent
Takeda et al.

(10) Patent No.: US 12,184,580 B2
(45) Date of Patent: Dec. 31, 2024

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Shohei Yoshioka, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 357 days.

(21) Appl. No.: 17/605,931

(22) PCT Filed: Apr. 25, 2019

(86) PCT No.: PCT/JP2019/017725
§ 371 (c)(1),
(2) Date: Oct. 22, 2021

(87) PCT Pub. No.: WO2020/217408
PCT Pub. Date: Oct. 29, 2020

(65) Prior Publication Data
US 2022/0216972 A1    Jul. 7, 2022

(51) Int. Cl.
*H04L 5/00* (2006.01)
*H04W 24/08* (2009.01)
*H04W 88/02* (2009.01)

(52) U.S. Cl.
CPC .......... *H04L 5/0053* (2013.01); *H04W 24/08* (2013.01); *H04W 88/02* (2013.01)

(58) Field of Classification Search
CPC ...... H04L 5/0053; H04W 24/08; H04W 88/02
See application file for complete search history.

(56) References Cited

FOREIGN PATENT DOCUMENTS

| EP | 3661085 B1 * | 11/2021 | ........... H04L 1/0038 |
| JP | 6861891 B2 * | 4/2021 | .............. H04J 11/00 |
| WO | WO-2019223615 A1 * | 11/2019 | ........... H04B 7/0456 |

OTHER PUBLICATIONS

Office Action issued in Japanese Patent Application No. 2021-515427, dated Jul. 4, 2023 (10 pages).
Office Action issued in the counterpart Russian Patent Application No. 2021132543/07(068647), mailed on Jun. 27, 2022 (10 pages).
International Search Report issued in PCT/JP2019/017725 on Jul. 30, 2019 (4 pages).
Written Opinion of the International Searching Authority issued in PCT/JP2019/017725 on Jul. 30, 2019 (5 pages).

(Continued)

*Primary Examiner* — Mohammad S Anwar
(74) *Attorney, Agent, or Firm* — Osha Bergman Watanabe & Burton LLP

(57) ABSTRACT

A user terminal includes: a receiving section that receives configuration information of a search space set; and a control section that controls monitoring of downlink control information (DCI) of a first format other than formats 0_0 and 0_1 used for scheduling of an uplink shared channel and a second format other than formats 1_0 and 1_1 used for scheduling of a downlink shared channel in the search space set configured based on the configuration information. According to an aspect of the present disclosure, monitoring of downlink control information can be appropriately controlled.

7 Claims, 13 Drawing Sheets

(56) References Cited

OTHER PUBLICATIONS

Ericsson; "PDCCH enhancements for NR URLLC"; 3GPP TSG RAN WG1 Ad-Hoc Meeting 1901, Tdoc R1-1900158; Taipei, Taiwan; Jan. 21-25, 2019 (16 pages).
ETRI; "PDCCH enhancements for URLLC"; 3GPP TSG RAN WG1 Meeting #96, R1-1902441; Athens, Greece; Feb. 25-Mar. 1, 2019 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart Japanese Application No. 2021-515427, mailed Apr. 11, 2023 (8 pages).
3GPP TSG RAN WG1 #96; R1-1902532 "UL inter-UE Tx prioritisation and multiplexing" NEC; Athens, Greece; Feb. 25-Mar. 1, 2019 (4 pages).
3GPP TSG RAN WG1 Meeting #96bis; R1-1905876 "Summary of 7.2.6.1 PDCCH enhancements" Huawei; Xi'an, China; Apr. 8-12, 2019 (73 pages).
3GPP TS 38.331 V15.5.1 "3rd Generation Partnership Project; Technical Specification Group Radio Access Network; NR; Radio Resource Control (RRC) protocol specification (Release 15)" Apr. 2019 (491 pages).
Office Action issued in Japanese Application No. 2021-515427; Dated Nov. 15, 2022 (7 pages).
Office Action issued in Japanese Application No. 2023-172747, mailed Aug. 3, 2024 (6 pages).
LG Electronics: "Remaining issues on downlink control channel"; 3GPP TSG RAN WG1 Meeting #94bis, R1-1810256; Chengdu, China, Oct. 8-12, 2018 (6 pages).
Huawei, HiSilicon: "PDCCH enhancements for URLLC"; 3GPP TSG RAN WG1 Meeting #96bis, R1-1903954; Xi'an, China, Apr. 8-12, 2019 (10 pages).

\* cited by examiner

```
SearchSpace ::=             SEQUENCE {
    searchSpaceId               SearchSpaceId,
    controlResourceSetId        ControlResourceSetId    OPTIONAL,   -- Cond SetupOnly
    monitoringSlotPeriodicityAndOffset  CHOICE {
        ...}                                            OPTIONAL,   -- Cond Setup
    duration                    INTEGER (2..2559)                   OPTIONAL,   -- Need R
    monitoringSymbolsWithinSlot BIT STRING (SIZE (14))               OPTIONAL,   -- Cond Setup
    nrofCandidates              SEQUENCE {
        ...}                                            OPTIONAL,   -- Cond Setup
    searchSpaceType             CHOICE {
        common                      SEQUENCE {
            dci-Format0-0-AndFormat1-0  SEQUENCE {
                ...}                                    OPTIONAL,   -- Need R
            dci-Format2-0               SEQUENCE {
                nrofCandidates-SFI          SEQUENCE {
                    ...},
                ...}                                    OPTIONAL,   -- Need R
            dci-Format2-1               SEQUENCE {
                ...}                                    OPTIONAL,   -- Need R
            dci-Format2-2               SEQUENCE {
                ...}                                    OPTIONAL,   -- Need R
            dci-Format2-3               SEQUENCE {
                ...}                                    OPTIONAL    -- Need R
        },
        ue-Specific                 SEQUENCE {
            dci-Formats                 ENUMERATED {formats0-0-And-1-0, formats0-1-And-1-1},
            ...
        }
    }
}
```

```
PDCCH-Config ::=           SEQUENCE {
    ...
    searchSpacesToAddModList    SEQUENCE(SIZE (1..10)) OF SearchSpace    OPTIONAL,    -- Need N
    ...
    downlinkPreemption          SetupRelease { DownlinkPreemption }      OPTIONAL,    -- Need M
    uplinkPreemption            SetupRelease { UplinkPreemption }
    ...
}
```

FIG. 5B

```
UplinkPreemption ::=       SEQUENCE {
    int-RNTI                RNTI-Value,
    timeFrequencySet        ENUMERATED {set0, set1},
    dci-PayloadSize         INTEGER (0..maxINT-DCI-PayloadSize),
    ...
}
```

```
SearchSpace ::=            SEQUENCE {
    searchSpaceId              SearchSpaceId,
    controlResourceSetId       ControlResourceSetId            OPTIONAL,    -- Cond SetupOnly
    monitoringSlotPeriodicityAndOffset    CHOICE {
        ...}                                                   OPTIONAL,    -- Cond Setup
    duration                   INTEGER (2..2559)               OPTIONAL,    -- Need R
    monitoringSymbolsWithinSlot BIT STRING (SIZE (14))          OPTIONAL,    -- Cond Setup
    nrofCandidates             SEQUENCE {
        ...},                                                  OPTIONAL,    -- Cond Setup
    searchSpaceType            CHOICE {
        common                     SEQUENCE {
            dci-Format0-0-AndFormat1-0    SEQUENCE {
                ...}                                           OPTIONAL,    -- Need R
            dci-Format2-0                 SEQUENCE {
                nrofCandidates-SFI            SEQUENCE {
                    ...},
                ...},
            dci-Format2-1                 SEQUENCE {
                ...}                                           OPTIONAL,    -- Need R
            dci-Format2-2                 SEQUENCE {
                ...}                                           OPTIONAL,    -- Need R
            dci-Format2-3                 SEQUENCE {
                ...}                                           OPTIONAL,    -- Need R
            dci-Format2-4                 SEQUENCE {
                ...}
        },
        ue-Specific                SEQUENCE {
            dci-Formats                ENUMERATED {formats0-0-And-1-0, formats0-1-And-1-1},
            ...
        }
    }
}
```

FIG. 6

```
SearchSpace ::=                  SEQUENCE {
    searchSpaceId                    SearchSpaceId,
    controlResourceSetId             ControlResourceSetId         OPTIONAL,    -- Cond SetupOnly
    monitoringSlotPeriodicityAndOffset   CHOICE {
        ...}                                                      OPTIONAL,    -- Cond Setup
    duration                         INTEGER (2..2559)            OPTIONAL,    -- Need R
    monitoringSymbolsWithinSlot      BIT STRING (SIZE (14))       OPTIONAL,    -- Cond Setup
    nrofCandidates                   SEQUENCE {
        ...}                                                      OPTIONAL,    -- Cond Setup
    searchSpaceType                  CHOICE {
        common                           SEQUENCE {
            dci-Format0-0-AndFormat1-0       SEQUENCE {
                ...}                                              OPTIONAL,    -- Need R
            dci-Format2-0                    SEQUENCE {
                nrofCandidates-SFI               SEQUENCE {
                    ...},
                ...}                                              OPTIONAL,    -- Need R
            dci-Format2-1                    SEQUENCE {
                ...}                                              OPTIONAL,    -- Need R
            dci-Format2-2                    SEQUENCE {
                ...}                                              OPTIONAL,    -- Need R
            dci-Format2-3                    SEQUENCE {
                ...}                                              OPTIONAL,    -- Need R
        },
        ue-Specific                      SEQUENCE {
            dci-Formats                      ENUMERATED {formats0-0-And-1-0, formats0-1-And-1-1,
dci-Format2-4 },
            ...
        }
    }
}
```

FIG. 7

USER TERMINAL AND RADIO COMMUNICATION METHOD

TECHNICAL FIELD

The present disclosure relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (hereinafter also referred to as NR), introduction of new formats other than existing formats of downlink control information (DCI) (for example, DCI formats 1_0, 1_1, 0_0, 0_1, 2_0, 2_1, 2_2, and 2_3) has been under study.

The new formats may be used for at least one of, for example, services of high reliable and low latency communication (Ultra-Reliable and Low-Latency Communications (URLLC)) and uplink preemption.

However, when the new formats are introduced, search space sets used for monitoring (also referred to as blind decoding or the like) of the DCI may not be able to be appropriately configured for the UE. As a result, the UE may not be able to appropriately control monitoring of the DCI.

In the light of this, the inventors of the present invention have one object to provide a user terminal and a radio communication method that enable appropriate control of monitoring of DCI.

Solution to Problem

A user terminal according to an aspect of the present disclosure includes: a receiving section that receives configuration information of a search space set; and a control section that controls monitoring of downlink control information (DCI) of a first format other than formats 0_0 and 0_1 used for scheduling of an uplink shared channel and a second format other than formats 1_0 and 1_1 used for scheduling of a downlink shared channel in the search space set configured based on the configuration information.

Advantageous Effects of Invention

According to an aspect of the present disclosure, monitoring of DCI can be appropriately controlled.

BRIEF DESCRIPTION OF DRAWINGS

FIG. 1 is a diagram to show an example of SS configuration information;

FIGS. 5A and 5B are each a diagram to show an example of UE-specific PDCCH information according to a second aspect;

FIG. 6 is a diagram to show an example of the SS configuration information according to the second aspect;

FIG. 7 is a diagram to show another example of the SS configuration information according to the second aspect;

DESCRIPTION OF EMBODIMENTS (Search Space Set)

Figure 2:
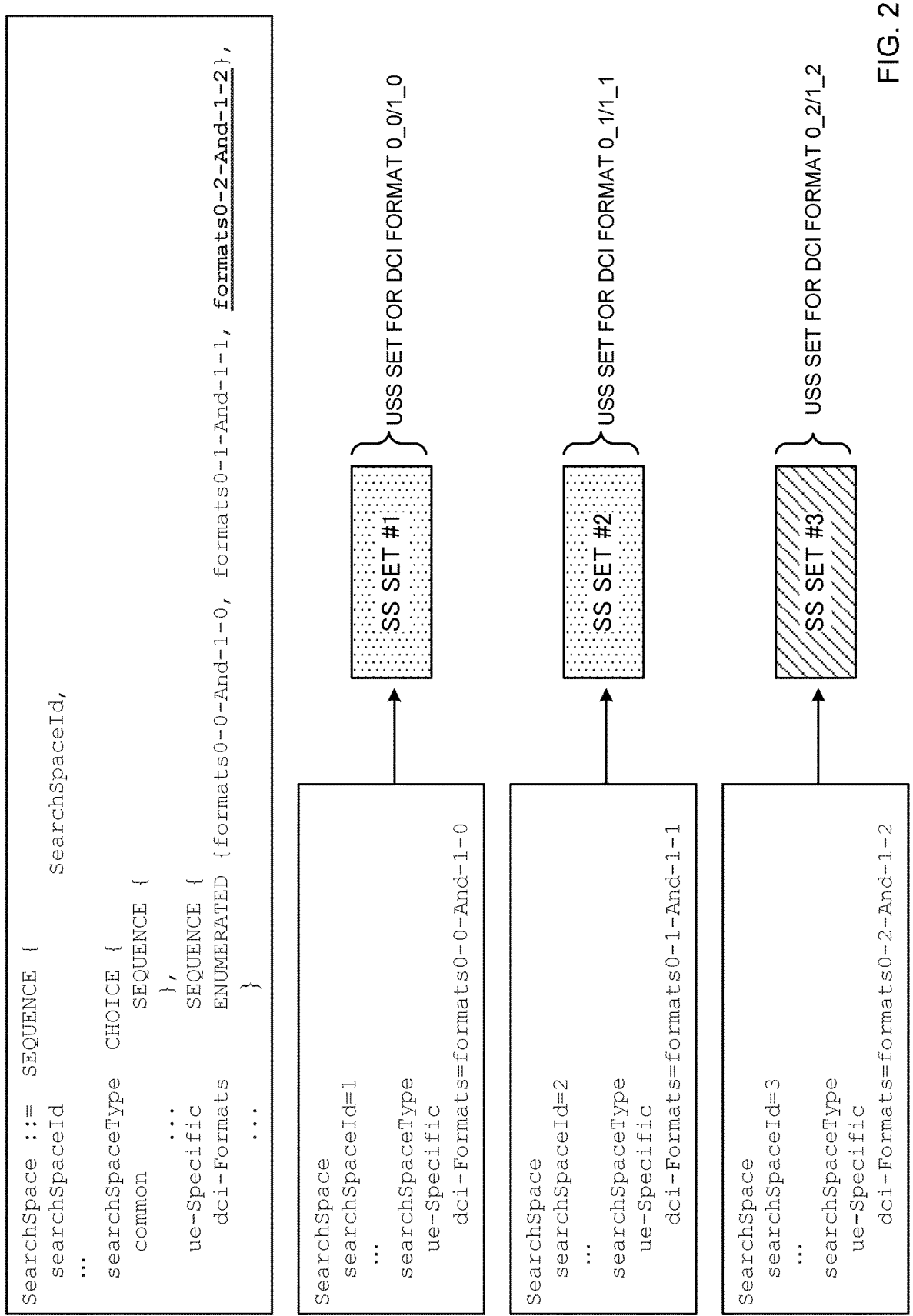
FIG. 2 is a diagram to show an example of the SS configuration information according to a first configuration example of a first aspect.

The UE is configured with one or more search space (SS) sets. The SS set is also referred to as a PDCCH search space set, a search space, or the like.

The UE monitors PDCCH candidates in one or more SS sets. The one or more SS sets may include at least one of a common SS set (common search space (CSS) set) for one or more UEs and a UE-specific SS set (UE-specific search space (USS) set).

The UE may receive configuration information of each SS set (SS configuration information, for example, a Radio Resource Control (RRC) information element (IE) (also referred to as an RRC parameter) "SearchSpace"). For example, the UE may receive each piece of SS configuration information using higher layer signaling. Each piece of SS configuration information may be included in configuration information of a UE-specific PDCCH (for example, an RRC IE "PDCCH-Config") or configuration information of a cell-specific PDCCH (for example, an RRC IE "PDCCH-ConfigCommon").

Each piece of SS configuration information may include, for example, at least one of the following parameters (or information related to at least one of the following).
(1) Identifier of the SS set (search space ID, for example, an RRC IE "searchSpaceId")
(2) Identifier of a CORESET associated with the SS set (control resource set ID, for example, an RRC IE "controlResourceSetId")
(3) Periodicity and offset of a monitoring occasion including the SS set (for example, an RRC IE "monitoringSlotPeriodicityAndOffset")
(4) Time period of the monitoring occasion (for example, an RRC IE "duration")
(5) Number of PDCCH candidates for each aggregation level in the SS set (for example, an RRC IE "nrofCandidates")
(6) Type of SS set such as the CSS set or the USS set (search space type, for example, an RRC IE "searchSpaceType")
(7) Information related to the CSS set (CSS set information, for example, an RRC IE "common")
(8) Information related to the USS set (USS set information, for example, an RRC IE "ue-Specific")

Here, (7) CSS set information may include information related to a DCI format monitored in the CSS set (DCI format information, for example, RRC IEs "dci-Format0-0-AndFormat1-0", "dci-Format2-0", "dci-Format2-1", "dci-Format2-2", and "dci-Format2-3"). The DCI format information for the CSS set may indicate, for example, at least one of the DCI format (at least one of DCI formats 0_0 and 1_0, DCI format 2_0, DCI format 2-1, DCI format 2-2, and DCI format 2_3) monitored in the CSS set and the number of PDCCH candidates for each aggregation level used for monitoring of the DCI format.

The CSS set may be, for example, a type 3-PDCCH CSS set used for monitoring of the DCI format used for scrambling in which cyclic redundancy check (CRC) bits are scrambled (CRF-scrambled) with a Slot Format Indicator (SFI)-radio network temporary identifier (RNTI), an Interruption (INT)-RNTI, a Transmit Power Control (TPC)-PUSCH-RNTI, a TPC-PUCCH-RNTI, or a TPC-Sounding Reference Symbols (SRS)-RNTI.

Further, (8) USS set information may include information related to the DCI format monitored in the USS set (DCI format information, for example, an RRC IE "dci-Formats"). The DCI format information for the USS set may indicate, for example, the DCI format (one of DCI formats 0_0 and 1_0 and DCI formats 0_1 and 1_1) monitored in the USS set.

The USS set is used for monitoring of the DCI format CRC-scrambled with a C-RNTI or a CS-RNTI. The UE may be configured with at least one of the USS set for monitoring of DCI formats 0_0 and 1_0 and the USS set for monitoring of DCI formats 0_1 and 1_1.

Here, DCI formats 1_0 and 1_1 are used for scheduling of a downlink shared channel (for example, a Physical Downlink Shared Channel (PDSCH)). DCI formats 0_0 and 0_1 are used for scheduling of an uplink shared channel (for example, a Physical Uplink Shared Channel (PUSCH)).

DCI formats 0_0 and 1_0 may have the same size (payload). Further, DCI formats 0_1 and 1_1 may have the same size. DCI formats 0_0 and 1_0 may have a size smaller than DCI formats 0_1 and 1_1, respectively. DCI formats 1_0 and 0_0 are also referred to as fallback DCI or the like. In contrast, DCI formats 1_1 and 1_0 are also referred to as non-fallback DCI or the like.

FIG. 1 is a diagram to show an example of the SS configuration information. As shown in FIG. 1, the SS configuration information (for example, the RRC IE "SearchSpace") may include at least one of the parameters (pieces of information) of (1) to (8) above.

Further, the DCI format information (for example, the RRC IE "dci-Formats") for the USS set in the SS configuration information of FIG. 1 may indicate whether the USS set identified with the search space ID is used for monitoring of DCI formats 0_0 and 1_0 or DCI formats 0_1 and 1_1.

The UE may be configured with each SS set, based on each piece of SS configuration information. Further, a given time period of given periodicity for monitoring (blind decoding) each SS set (PDCCH monitoring occasion, monitoring occasion (MO), monitoring time period) may be configured based on each piece of SS configuration information (for example, the parameters of (3) and (4) above).

Specifically, the UE may be configured with the monitoring occasion for each SS set. The UE may monitor the PDCCH candidates for the SS set in the CORESET in the configured monitoring occasion. The monitoring occasion may include one or more slots.

The maximum number of PDCCH candidates that the UE can monitor for each cell and for each slot may be limited. The maximum number may be determined for each subcarrier spacing $\mu$. For example, when the subcarrier spacing $\mu$ is 15 kHz, 30 kHz, 60 kHz, and 120 kHz, the maximum number may be 44, 36, 22, and 20, respectively.

Further, the maximum number of non-overlapping control channel elements (CCEs) for each cell and for each slot regarding the UE may be limited. The maximum number may be determined for each subcarrier spacing $\mu$. For example, when the subcarrier spacing $\mu$ is 15 kHz, 30 kHz, 60 kHz, and 120 kHz, the maximum number may be 56, 56, 48, and 32, respectively.

Incidentally, in NR, implementation of communication in which required conditions conform to a plurality of different services (also referred to as use cases, traffic types, or the like) in the same cell is assumed. The plurality of services may be, for example, a further enhanced broadband (enhanced Mobile Broadband (eMBB)) and high reliability and low latency communication (Ultra-Reliable and Low-Latency Communications (URLLC)). For example, in URLLC, lower latency and higher reliability as against those of eMBB are required.

Thus, in NR, in addition to the existing DCI formats (for example, DCI formats 1_0, 1_1, 0_0, 0_1, 2_0, 2_1, 2_2, and 2_3), introduction of new DCI formats has been under study. The new DCI formats may be, for example, used for scheduling of the PUSCH or the PDSCH and preemption (for example, uplink preemption).

Here, a new DCI format used for scheduling of the PDSCH is also referred to as DCI format 1_2 or the like. A new DCI format used for scheduling of the PUSCH may be referred to as DCI format 0_2 or the like. Further, a new DCI format used for uplink preemption is also referred to as DCI format 2_4 or the like.

Note that the terms of the new DCI formats are not limited to these. For example, the terms of the new DCI formats for scheduling of the PDSCH and the PUSCH may be terms arranged by replacing "2" of DCI formats 1_2 and DCI format 0_2 with any sequence of characters other than "0" or "1", or may be other terms. Further, a new DCI format for uplink preemption may be a term arranged by replacing "4" of DCI format 2_4 with any sequence of characters other than "0", "1", "2", or "3", or may be another term.

In this manner, when the new DCI format (for example, at least one of DCI formats 0_2, 1_2, and 2_4) used for scheduling of the PUSCH or the PDSCH or for preemption (for example, uplink preemption) is introduced, it is assumed that the SS set for monitoring the new DCI format is configured for the UE. However, how to signal configuration of the SS set poses a problem.

Specifically, how to configure the SS configuration information used for configuration of the SS set poses a problem. In the light of this, the inventors of the present invention came up with the idea of appropriately configuring the SS configuration information used for configuration of the SS set for monitoring the new DCI format, to thereby enable appropriate controlling of monitoring of the DCI even when the new DCI format is introduced.

Embodiments according to the present disclosure will be described below in detail with reference to the drawings.

The following will illustrate an example in which the new DCI format used for scheduling of the PUSCH is DCI format 0_2, the new DCI format used for scheduling of the PDSCH is DCI format 1_2, and the new DCI format for uplink preemption is DCI format 2_4. However, as described above, the terms of these new DCI formats are not limited to those illustrated herein.

(First Aspect)

A first aspect will describe configuration of the SS set (for example, the USS set) for monitoring at least one (DCI format 0_2/1_2) of DCI format 0_2 used for scheduling of the PUSCH and DCI format 1_2 used for scheduling of the PDSCH.

The SS set for DCI format 0_2/1_2 may be one of the USS sets configured based on SS configuration information (for example, the RRC IE "SearchSpace") (first configuration example), or may be a specific USS set configured based on SS configuration information (second SS configuration information) that is different from the above SS configuration information (first SS configuration information) (second configuration example).

First Configuration Example

The UE may be configured with one or more USS sets. Each USS set configured for the UE may be associated with DCI formats 0_0 and 1_0 (DCI format 0_0/1_0), DCI formats 0_1 and 1_1 (DCI format 0_1/1_1), or DCI format 0_2/1_2.

Each USS set may be configured based on the SS configuration information (for example, the RRC IE "SearchSpace"). Note that the DCI format information (for example, the RRC IE "dci-Formats") for the USS set in the SS configuration information may selectively indicate one of DCI format 0_0/1_0, DCI format 0_1/1_1, and DCI format 0_2/1_2 as the DCI format monitored in the USS set.

FIG. 2 is a diagram to show an example of the SS configuration information according to the first configuration example of the first aspect. Note that, although FIG. 2 shows a part of the parameters, the SS configuration information (for example, the RRC IE "SearchSpace") may include at least one parameter of (1) to (8) above.

As shown in FIG. 2, the DCI format information (for example, the RRC IE "dci-Formats") for the USS set in the SS configuration information (for example, the RRC IE "SearchSpace") is different from that of FIG. 1 in that not only DCI format 0_0/1_0 or DCI format 0_1/1_1 but also DCI format 0_2/1_2 can be specified as the DCI format monitored in the USS set.

As shown in FIG. 2, when SS set #1 is configured for the UE as the USS set for DCI format 0_0/1_0, the SS configuration information (for example, the RRC IE "SearchSpace") of SS set #1 may include the DCI format information (for example, the RRC IE "dci-Formats") indicating DCI format 0_0/1_0.

Further, when SS set #2 is configured for the UE as the USS set for DCI format 0_1/1_1, the SS configuration information (for example, the RRC IE "SearchSpace") of SS set #2 may include the DCI format information (for example, the RRC IE "dci-Formats") indicating DCI format 0_1/1_1.

Further, when SS set #2 is configured for the UE as the USS set for new DCI format 0_2/1_2, the SS configuration information (for example, the RRC IE "SearchSpace") of SS set #3 may include the DCI format information (for example, the RRC IE "dci-Formats") indicating DCI format 0_2/1_2.

In this manner, the USS set for DCI format 0_2/1_2 may be configured with the SS configuration information (for example, the RRC IE "SearchSpace") having the same configuration as the USS set for DCI format 0_0/1_0 or DCI format 0_1/1_1.

The UE may monitor the DCI format indicated by the DCI format information in SS sets #1 to #3 configured by the SS configuration information.

In the first configuration example, the DCI format information for the USS set in the SS configuration information specifies one of DCI format 0_0/0_1, DCI format 0_1/1_1, and DCI format 0_2/1_2, and thus the USS set for new DCI format 0_2/1_2 can be configured without adding a new parameter to the existing SS configuration information (for example, FIG. 1).

Further, the USS set for DCI format 0_0/1_0, the USS set for DCI format 0_1/1_1, and the USS set for DCI format 0_2/1_2 can be configured by using the SS configuration information having the same configuration.

Second Configuration Example

The USS set for DCI format 0_2/1_2 may be configured based on the second SS configuration information that is defined separately from the SS configuration information (for example, the RRC IE "SearchSpace", the first SS configuration information, for example, FIG. 1). The second SS configuration information may be used for configuration of only a specific SS set (for example, the USS set for DCI format 0_2/1_2), or may be used for configuration of the specific SS set and another SS set different from the specific SS set.

Figure 3:
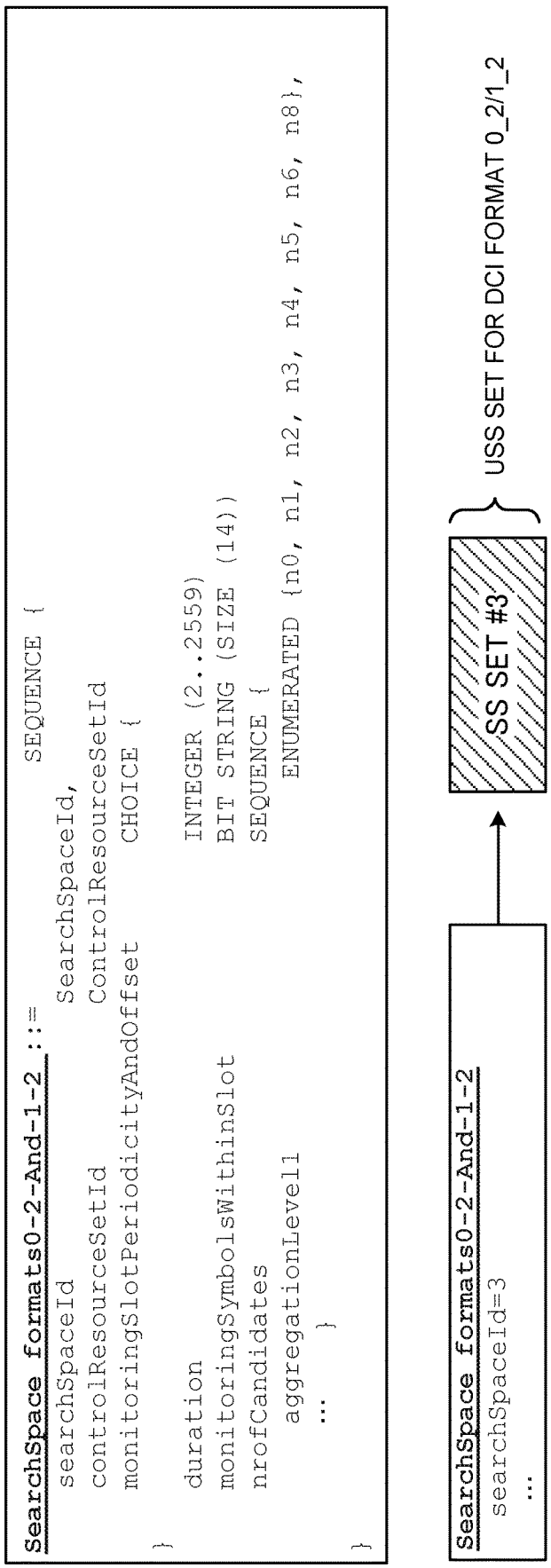
FIG. 3 is a diagram to show an example of second SS configuration information according to a second configuration example of the first aspect.

FIG. 3 is a diagram to show an example of the second SS configuration information according to the second configuration example of the first aspect. As shown in FIG. 3, the second SS configuration information (for example, an RRC IE "SearchSpace formats0-2-And-1-2" or "SearchSpace DCI0-2-And-1-2") may be used for configuration of a specific SS set (for example, the USS set for DCI format 0_2/1_2).

The second SS configuration information may include at least one parameter of (1) to (5) above. Note that the second SS configuration information may or may not include parameters of (6) to (8) above. The second SS configuration information is for configuration of the USS set for DCI format 0_2/1_2, and the search space type or the like thus need not be specified.

As shown in FIG. 3, when SS set θ3 is configured for the UE as the USS set for new DCI format 0_2/1_2, the UE may determine at least one of the search space ID "3", the control resource set ID of the CORESET associated with SS set #3, periodicity of the monitoring occasion including SS set #3, an offset and a time period, and the number of PDCCH candidates for each aggregation level in SS set #3, using the second SS configuration information.

In contrast, although not shown in the figure, when SS sets #1 and #2 are configured for the UE as the USS sets for DCI format 0_0/0_1 and DCI format 0_1/1_1, respectively, the UE may use the first SS configuration information (for example, the RRC IE "SearchSpace", see FIG. 1).

In this manner, the USS set for DCI format 0_2/1_2 may be configured by the second SS configuration information (for example, the RRC IE "SearchSpace formats0-2-And-1-2" or "SearchSpace DCI0-2-And-1-2") that has configuration different from the first SS configuration information (for example, the RRC IE "SearchSpace") used for the configuration of the USS set for DCI format 0_0/1_0 or DCI format 0_1/1_1.

The UE may monitor the DCI format (DCI format 0_0/1_0 or DCI format 0_1/1_1) indicated by the DCI format information (for example, the RRC IE "dci-Formats" of FIG. 1) for the USS set in the first SS configuration information in SS sets #1 and #2 configured by the first SS configuration information. In contrast, the UE may monitor DCI format 0_2/1_2 in SS set #3 configured by the second SS configuration information.

As shown in FIG. 3, by defining the second SS configuration information used for configuration of a specific SS set (for example, the USS set for DCI format 0_2/1_2), the USS set for new DCI format 0_2/1_2 can be configured without making changes to the existing first SS configuration information (for example, FIG. 1).

Figure 4:
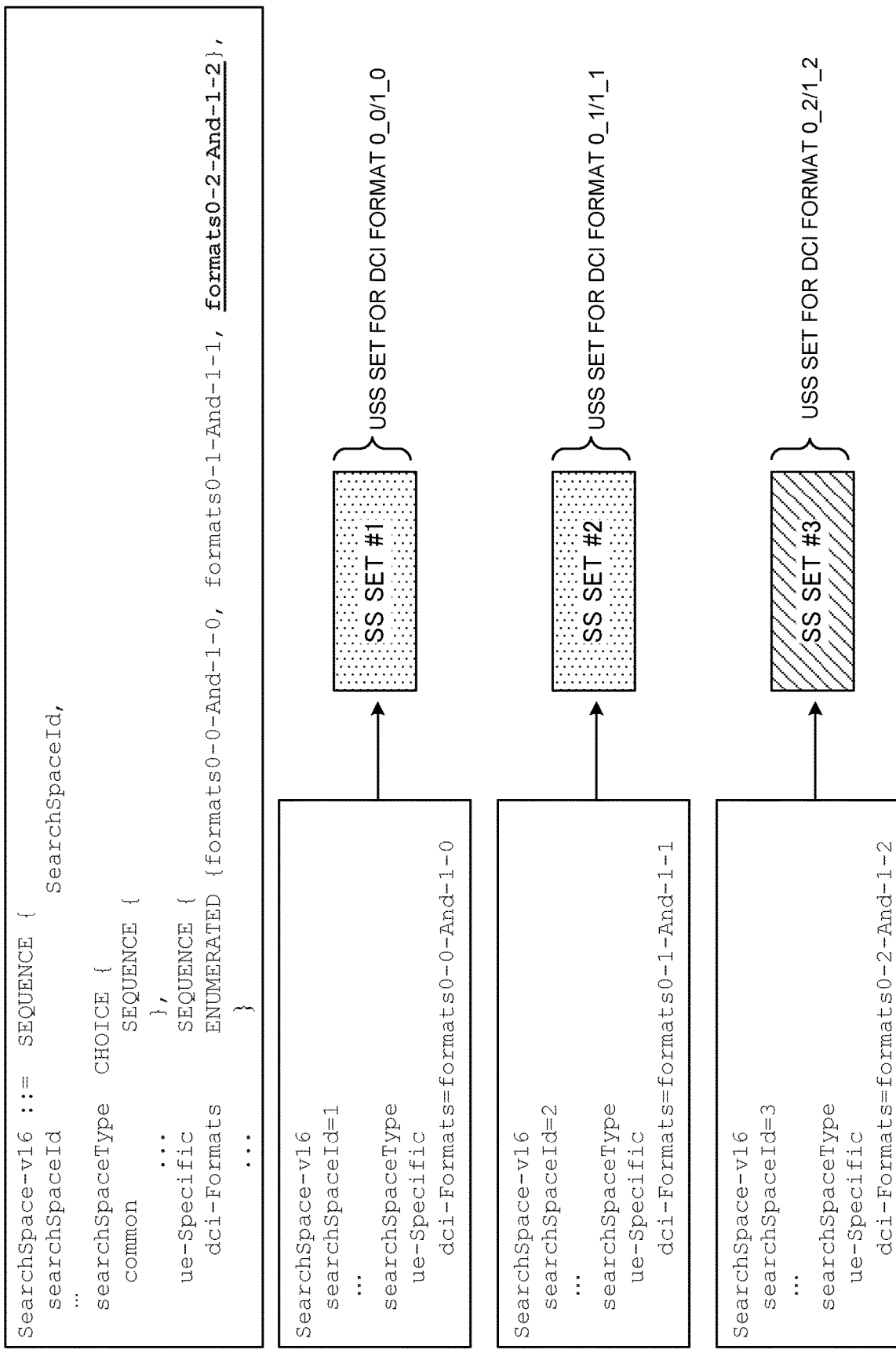
FIG. 4 is a diagram to show another example of the second SS configuration information according to the second configuration example of the first aspect.

FIG. 4 is a diagram to show another example of the second SS configuration information according to the second configuration example of the first aspect. The second SS configuration information (for example, an RRC IE "SearchSpace-v16") may be used not only for configuration of a specific SS set (for example, the USS set for DCI format 0_2/1_2), but also for configuration of another SS set (for example, at least one of the CSS set and the USS set).

Note that, although FIG. 4 shows a part of the parameters, the second SS configuration information (for example, an RRC IE "SearchSpace-r16") may include at least one parameter of (1) to (8) above. The DCI format information (for example, the RRC IE "dci-Formats") for the USS set in the second SS configuration information (for example, the RRC IE "SearchSpace-r16") is different from the first SS configuration information (for example, the RRC IE "SearchSpace") shown in FIG. 1 in that not only DCI format 0_0/1_0 or DCI format 0_1/1_1 but also DCI format 0_2/1_2 can be specified as the DCI format monitored in the USS set.

The first SS configuration information (for example, the RRC IE "SearchSpace") shown in FIG. 1 may be used for configuration of the SS set for the UE that does not assume configuration of the SS set for DCI format 0_2/1_2 (for example, the UE that supports up to Rel. 15). In contrast, the second SS configuration information (for example, the RRC IE "SearchSpace-r16") shown in FIG. 4 may be used for configuration of the SS set for the UE that assumes configuration of the SS set for DCI format 0_2/1_2 (for example, the UE that supports Rel. 16).

In this manner, depending upon whether or not the UE supports a new DCI format, different pieces of SS configuration information (for example, the first SS configuration information of FIG. 1 and the second SS configuration information of FIG. 4) may be used for configuration of the SS set.

As shown in FIG. 4, when SS set #1 is configured for the UE as the USS set for DCI format 0_0/1_0, the second SS configuration information (for example, the RRC IE "SearchSpace-r16") for SS set #1 may include the DCI format information (for example, the RRC IE "dci-Formats") indicating DCI format 0_0/1_0.

Further, when SS set #2 is configured for the UE as the USS set for DCI format 0_1/1_1, the second SS configuration information (for example, the RRC IE "SearchSpace-r16") for SS set #2 may include the DCI format information (for example, the RRC IE "dci-Formats") indicating DCI format 0_1/1_1.

Further, when SS set #3 is configured for the UE as the USS set for new DCI format 0_2/1_2, the second SS configuration information (for example, the RRC IE "SearchSpace-r16") for SS set #3 may include the DCI format information (for example, the RRC IE "dci-Formats") indicating DCI format 0_2/1_2.

The UE may monitor the DCI format indicated by the DCI format information in SS sets #1 to #3 configured by the second SS configuration information.

As shown in FIG. 4, by defining the second SS configuration information (for example, the RRC IE "SearchSpace-r16") for the UE that supports a new DCI format (for example, DCI format 0_2/1_2), operation can be distinguished from operation of the UE that does not support the new DCI format (for example, DCI format 0_2/1_2).

In the second configuration example, by newly defining the second SS configuration information, the SS set for a new DCI format (for example, the USS set for DCI format 0_2/1_2) can be appropriately configured.

(Second Aspect)

A second aspect will describe configuration of the SS set for monitoring DCI format 2_4 used for uplink preemption.

Each field in DCI format 2_4 may indicate uplink pre-emption indication (Pre-emption indication). Each field may include a given number of bits (for example, 14 bits).

DCI format 2_4 may be common DCI for a group of one or more UEs (also referred to as group common DCI, UE group common DCI, or the like) or UE-specific DCI. The SS set for monitoring DCI format 2_4 may be the CSS set (for example, the type 3-PDCCH CSS set) or the USS set.

Information related to uplink preemption (uplink preemption information, for example, an RRC IE "UplinkPreemption") may be included in UE-specific PDCCH information (for example, the RRC IE "PDCCH-Config").

Further, the SS set for DCI format 2_4 may be configured using the SS configuration information (for example, the RRC IE "SearchSpace"). The SS configuration information may be included in the UE-specific PDCCH information.

FIGS. 5A and 5B are each a diagram to show an example of the UE-specific PDCCH information according to the second aspect. As shown in FIG. 5A, the UE-specific PDCCH information (for example, the RRC IE "PDCCH-Config") may include at least one of information related to uplink preemption (uplink preemption information, for example, the RRC IE "UplinkPreemption") and a list (SS list, for example, an RRC IE "searchSpacesToAddModList") of one or more pieces of SS configuration information (for example, the RRC IE "SearchSpace").

As shown in FIG. 5B, the uplink preemption information (for example, the RRC IE "UplinkPreemption") may include at least one of the following.

Information (for example, an RRC IE "int-RNTI") indicating an RNTI (for example, an INT-RNTI) used for CRC scrambling of DCI format 2_4

Information (for example, an RRC IE "dci-PayloadSize") indicating a payload of DCI format 2_4 CRC-scrambled with the INT-RNTI Information (preemption resource information, for example, an RRC IE "timeFrequencySet") related to preempted resources (for example, at least one of frequency domain resources and time domain resources)

For example, the preemption resource information may indicate association between bits of a given field in DCI format 2_4 and one or more symbols.

The SS set for DCI format 2_4 may be configured based on the SS configuration information in the SS list. The SS set may be the CSS set, or may be the USS set.

FIG. 6 is a diagram to show an example of the SS configuration information according to the second aspect. FIG. 6 shows an example of the SS configuration information that can configure the CSS set for DCI format 2_4. As shown in FIG. 6, the SS configuration information may include at least one parameter of (1) to (8) above.

As shown in FIG. 6, the CSS set information (for example, the RRC IE "common") is different from that of FIG. 1 in that information related to DCI format 2_4 (DCI format 2_4 information, for example, an RRC IE "dci-Format2-4") monitored in the CSS set is included as the DCI format information for the CSS set.

The DCI format information for the CSS set shown in FIG. 6 may indicate, for example, at least one of the DCI format (at least one of DCI formats 0_0 and 1_0, DCI format 2_0, DCI format 2-1, DCI format 2-2, DCI format 2_3, and DCI format 2_4) monitored in the CSS and the number of PDCCH candidates for each aggregation level used for monitoring of the DCI format.

When the CSS set information in the SS configuration information includes the DCI format 2_4 information (for example, the RRC IE "dci-Format2-4"), the UE may monitor DCI format 2_4 in the CSS set configured by the SS configuration information.

FIG. 7 is a diagram to show another example of the SS configuration information according to the second aspect. FIG. 7 shows an example of the SS configuration information that can configure the USS set for DCI format 2_4. As shown in FIG. 7, the SS configuration information may include at least one parameter of (1) to (8) above.

As shown in FIG. 7, the USS set information (for example, the RRC IE "ue-Specific") may include the DCI format information (for example, the RRC IE "dci-Formats") that can specify DCI format 0_0/1_0, DCI format 0_1/1_1, or DCI format 2-4.

The UE may monitor the USS set configured by the SS configuration information in the DCI format indicated by the DCI format information in the USS set information.

In the second aspect, when DCI format 2_3 for UL preemption is supported, the SS set for DCI format 2_3 can be appropriately configured for the UE.

(Third Aspect)

It is assumed that given limitations (for example, the maximum number of PDCCH candidates that can be monitored for each cell and for each slot described above, and the number of CCEs that can overlap for each cell and for each slot described above) are set on monitoring of the DCI (also referred to as PDCCH monitoring, DCI monitoring, monitoring, blind decoding, or the like) performed by the UE.

Thus, when DCI format 0_2/1_2 is newly introduced, UE may possibly drop at least one (monitoring/processing of DCI format 0_2/1_2) of monitoring of DCI format 0_2/1_2 and processing based on DCI format 0_2/1_2. Further, when DCI format 2_4 is newly introduced as well, a similar problem occurs.

In view of this, the UE may perform prioritization of one or more SS sets configured for the UE. Specifically, the UE may perform prioritization of the one or more SS sets, regardless of whether or not each SS set is the SS set (for example, the USS set) for monitoring DCI format 0_2/1_2 (first prioritization). Alternatively, the UE may perform prioritization of the one or more SS sets, based on whether or not each SS set is the SS set (for example, the USS set) for monitoring DCI format 0_2/1_2 (second prioritization).

<First Prioritization>

In the first prioritization, priority of the SS sets may be determined based on the search space IDs (SS set indices), regardless of whether or not each SS set is the SS set (for example, the USS set) for monitoring DCI format 0_2/1_2. For example, the priority of the SS set having a smaller (lower) search space ID may be determined to be higher than the priority of the SS set having a larger (higher) search space ID.

Figure 8:
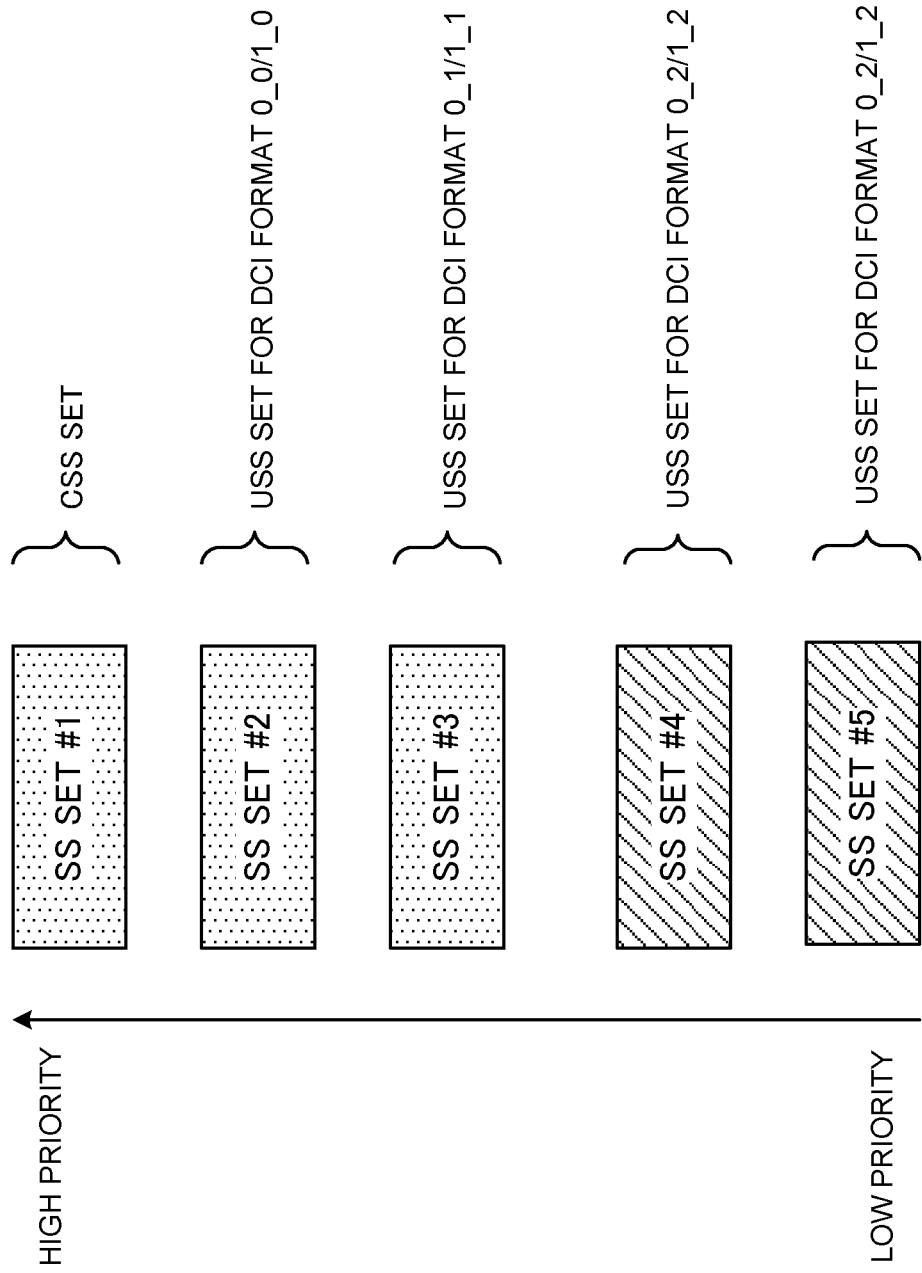
FIG. 8 is a diagram to show an example of first prioritization of SS sets according to a third aspect.

FIG. 8 is a diagram to show an example of the first prioritization of the SS sets according to the third aspect. Although FIG. 8 shows SS sets #1 to #5 configured for the UE, the number, the IDs, and the like of SS sets configured for the UE are not limited to those shown in the figure. For example, SS set #0 may be configured for the UE.

For example, in FIG. 8, SS set #1 is the CSS set, SS set #2 is the USS set for DCI format 0_0/1_0, SS set #3 is the USS set for DCI format 0_1/1_1, SS set #4 is the USS set for DCI format 0_2/1_2, and SS set #5 is the USS set for DCI format 0_2/1_2.

As shown in FIG. 8, in the first prioritization, the priority of the SS sets may be configured based on the search space IDs, regardless of whether or not each SS set is the USS set for DCI format 0_2/1_2. For example, in FIG. 8, higher priority is configured for the SS set having a smaller (lower) search space ID.

When at least some of the monitoring occasions of respective SS sets #1 to #5 overlap in the same time unit (for example, a slot), the UE may control monitoring of SS sets #1 to #5, based on the search space IDs. Specifically, the UE may prioritize monitoring of the SS set having a small search space ID over monitoring of the SS set having a search space ID.

Note that, in FIG. 8, the priority of SS sets #1 to #5 is determined based on the search space IDs regardless of the search space types, but this is not restrictive. The priority of SS sets #1 to #5 may be determined based on the search space IDs and the search space types. For example, the priority of the CSS set may be determined to be higher than the priority of the USS set, and among the SS sets having the same search space type, the priority of the SS sets may be determined in ascending order or descending order of the search space IDs.

<Second Prioritization>

In the second prioritization, the priority of the SS sets may be determined based on whether or not each SS set is the SS set (for example, the USS set) for monitoring DCI format 0_2/1_2. For example, the priority of the SS set for monitoring DCI format 0_2/1_2 may be determined to be higher than the priority of the SS set for monitoring other DCI formats.

Figure 9:
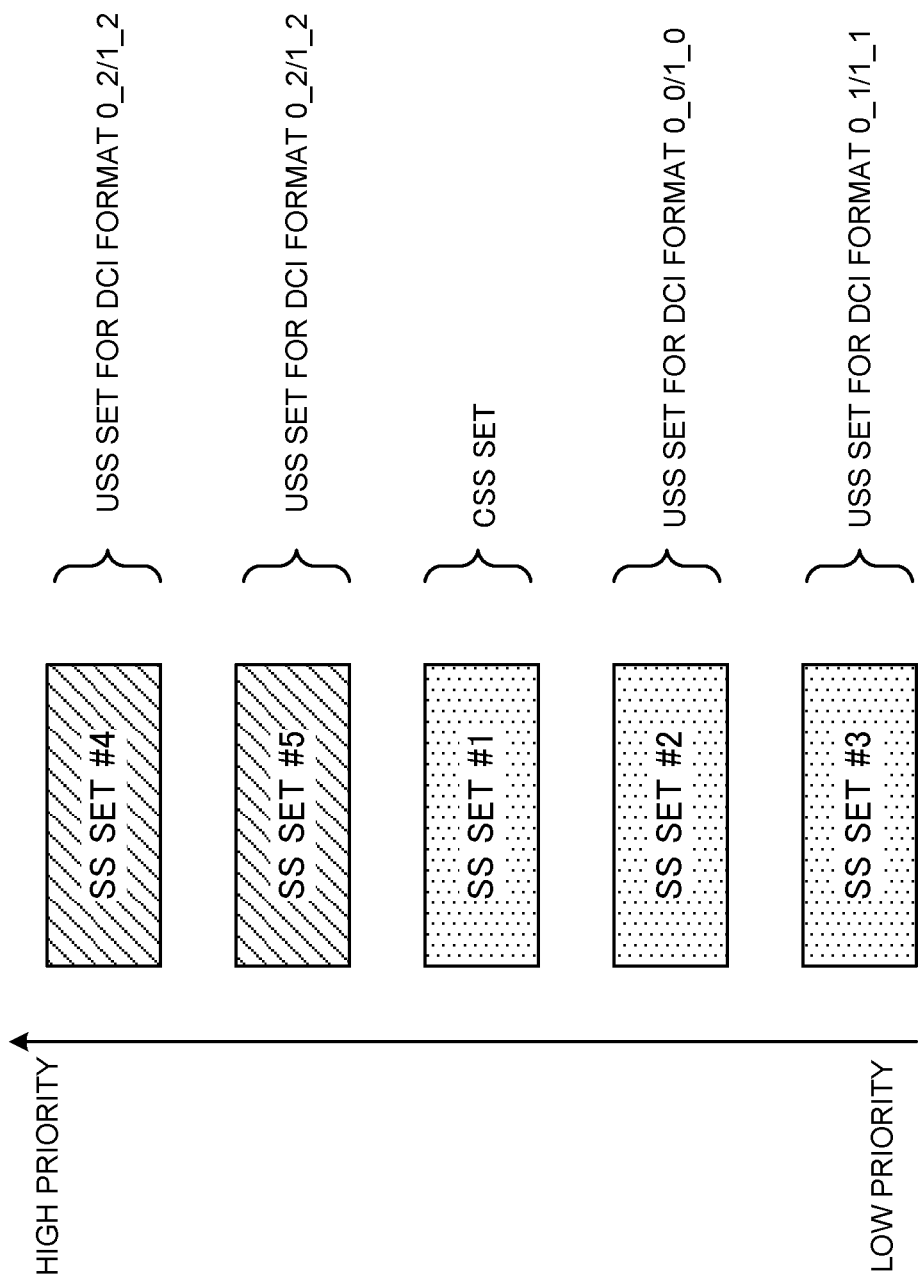
FIG. 9 is a diagram to show an example of second prioritization of the SS sets according to the third aspect.

FIG. 9 is a diagram to show an example of the second prioritization of the SS sets according to the third aspect. With reference to FIG. 9, differences from FIG. 8 will mainly be described.

As shown in FIG. 9, in the second prioritization, the priority of the SS sets may be configured based on whether or not each SS set is the USS set for DCI format 0_2/1_2. For example, in FIG. 9, the priority of SS sets #4 and #5 each being the USS set for DCI format 0_2/1_2 is determined to be higher than the priority of other SS sets #1 to #3.

Further, in the second prioritization, among SS sets #4 and #5 each being the USS set for DCI format 0_2/1_2, the priority of SS sets #4 and #5 may be determined based on the search space IDs. For example, in FIG. 9, SS set #4 having a smaller search space ID is prioritized over SS set #5 having a larger search space ID.

Similarly, among SS sets #1 to #3 other than the USS sets for DCI format 0_2/1_2, the priority of SS sets #1 to #3 may be determined based on the search space IDs. For example, in FIG. 9, the priority of SS sets #1 to #3 is determined to be ascending order of the search space IDs.

When at least some of the monitoring occasions of respective SS sets #1 to #5 overlap in the same time unit (for example, a slot), the UE may control monitoring of SS sets #1 to #4, based on whether or not each SS set is the USS set for DCI format 0_2/1_2 and the search space IDs.

Note that, in FIG. 9, the priority of SS sets #1 to #3 is determined based on the search space IDs regardless of the search space types, but this is not restrictive. The priority of SS sets #1 to #3 may be determined based on the search space IDs and the search space types. For example, the priority of the CSS set may be determined to be higher than the priority of the USS set, and among the SS sets having the same search space type, the priority of the SS sets may be determined in ascending order or descending order of the search space IDs.

As described above, in the third aspect, even when DCI format 0_2/1_2 is introduced, and the monitoring occasions of one or more SS sets configured for the UE overlap, monitoring can be appropriately controlled according to the priority of the SS sets.

(Other Aspects)

Note that the first aspect and the second aspect may be combined together. For example, the SS configuration information of FIG. 2 or the second SS configuration information of FIG. 4 and the SS configuration information of FIG. 6 or FIG. 7 may be combined together.

Specifically, when the pieces of SS configuration information of FIGS. 2 and 6 are combined together, the DCI format information (for example, the RRC IE "dci-Formats") in the USS set information (for example, the RRC IE "ue-Specific") of FIG. 6 may specify one of DCI format 0_0/1_0, DCI format 0_1/1_1, and DCI format 0_2/1_2.

Further, when the pieces of SS configuration information of FIGS. 2 and 7 are combined together, the DCI format information (for example, the RRC IE "dci-Formats") in the USS set information (for example, the RRC IE "ue-Specific") of FIG. 7 may specify one of DCI format 0_0/1_0, DCI format 0_1/1_1, DCI format 0_2/1_2, and DCI format 2_4.

Further, when the second SS configuration information of FIG. 4 and the SS configuration information of FIG. 6 are combined together, the CSS set information (for example, the RRC IE "common") in the second SS configuration information (for example, the RRC IE "SearchSpace-v16") of FIG. 4 may include the DCI format 2_4 information (for example, the RRC IE "dci-Format2-4").

Further, when the second SS configuration information of FIG. 4 and the SS configuration information of FIG. 7 are combined together, the DCI format information (for example, the RRC IE "dci-Formats") in the USS set information (for example, the RRC IE "ue-Specific") in the second SS configuration information (for example, the RRC IE "SearchSpace-v16") of FIG. 4B may specify one of DCI format 0_0/1_0, DCI format 0_1/1_1, DCI format 0_2/1_2, and DCI format 2_4.

Further, the second aspect and the third aspect or the first to third aspects may be combined together. For example, although the SS set for DCI format 2_4 is not explicitly shown in FIGS. 8 and 9, the priority of the SS set for DCI format 2_4 may also be determined according to the first or second prioritization.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
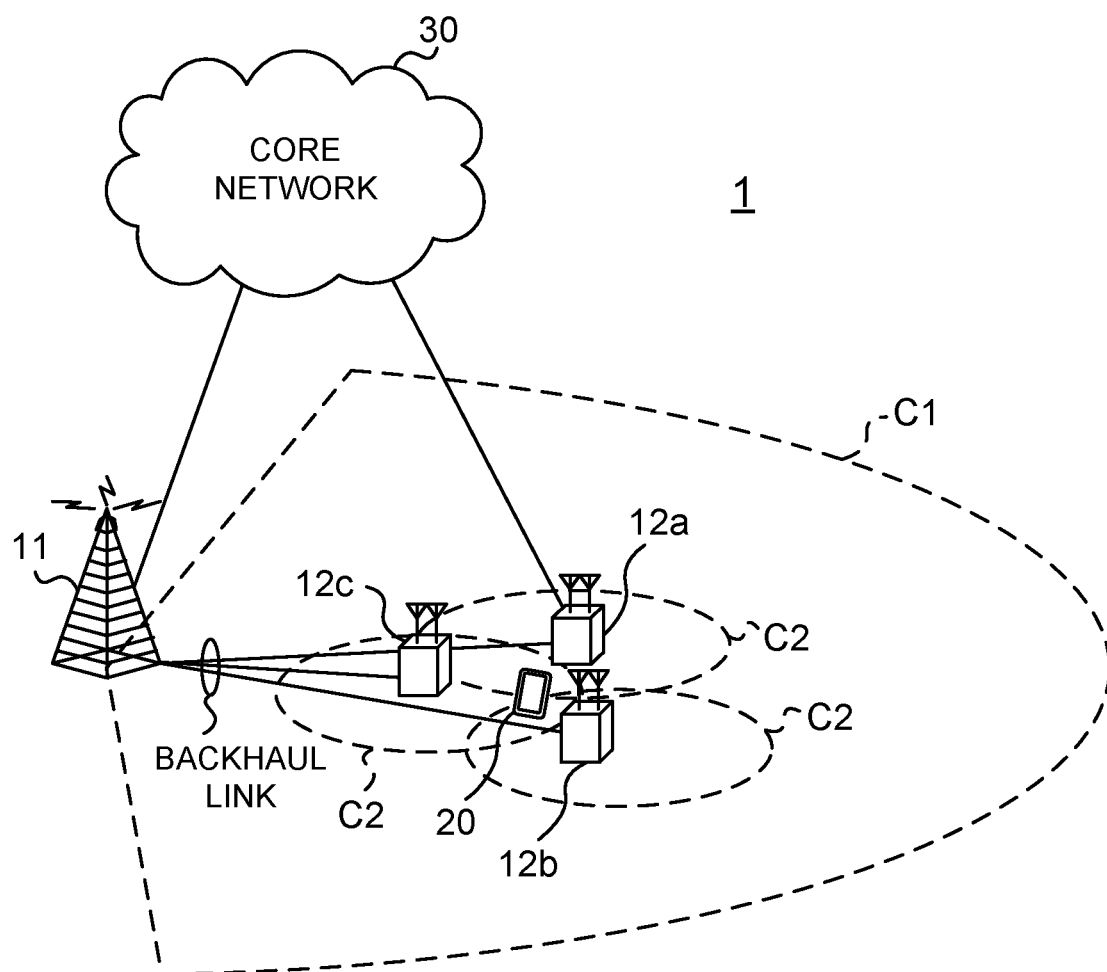
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
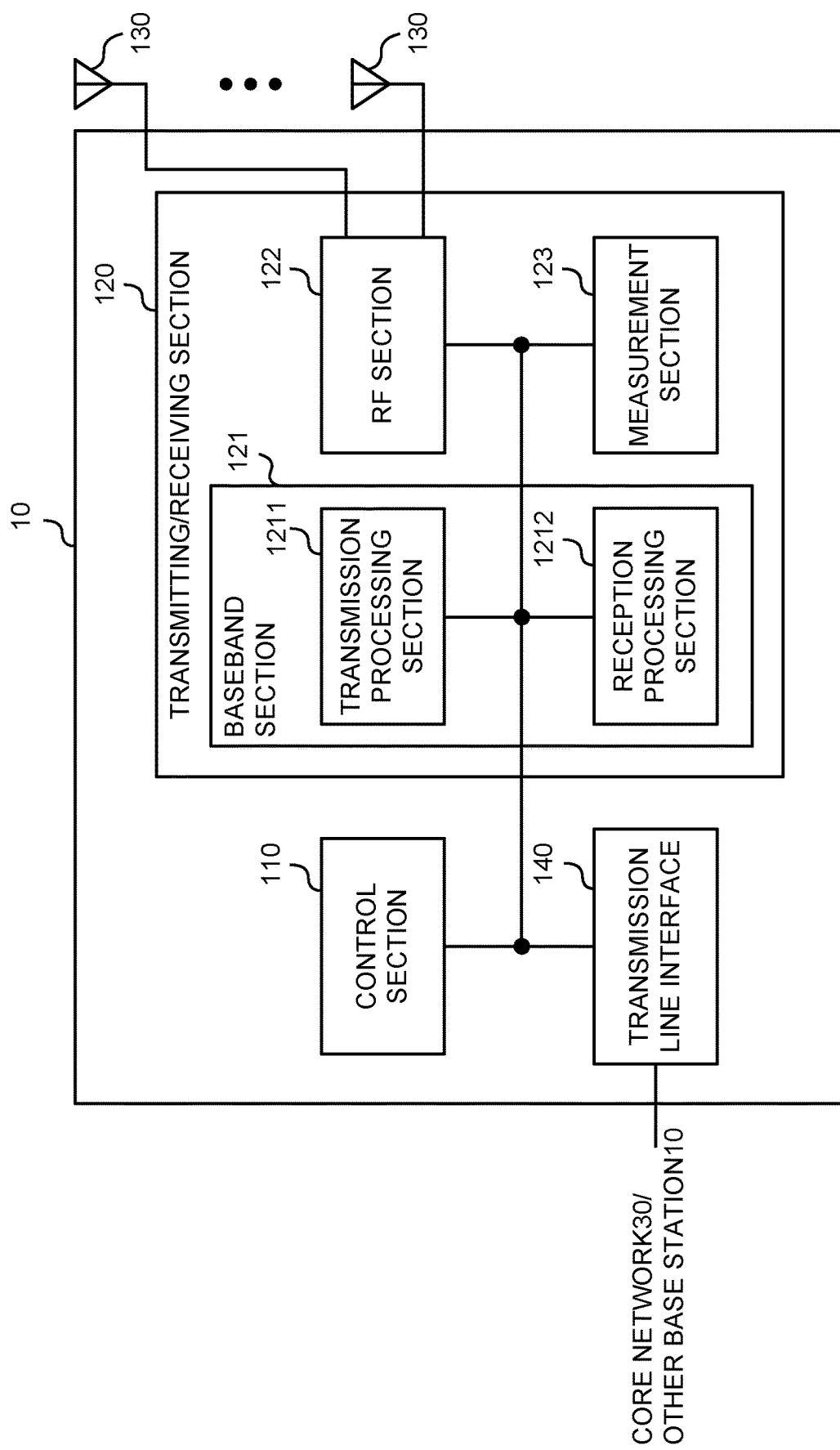
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 transmits downlink control information. The transmitting/receiving section 120 may receive an uplink signal (for example, an uplink shared channel), and transmit a downlink signal (for example, a downlink shared channel). The transmitting/receiving section 120 transmits configuration information of a search space set. The transmitting/receiving section 120 may transmit configuration information (for example, UE-specific PDCCH information or cell-specific PDCCH information) of a downlink control channel.

(User Terminal)

Figure 12:
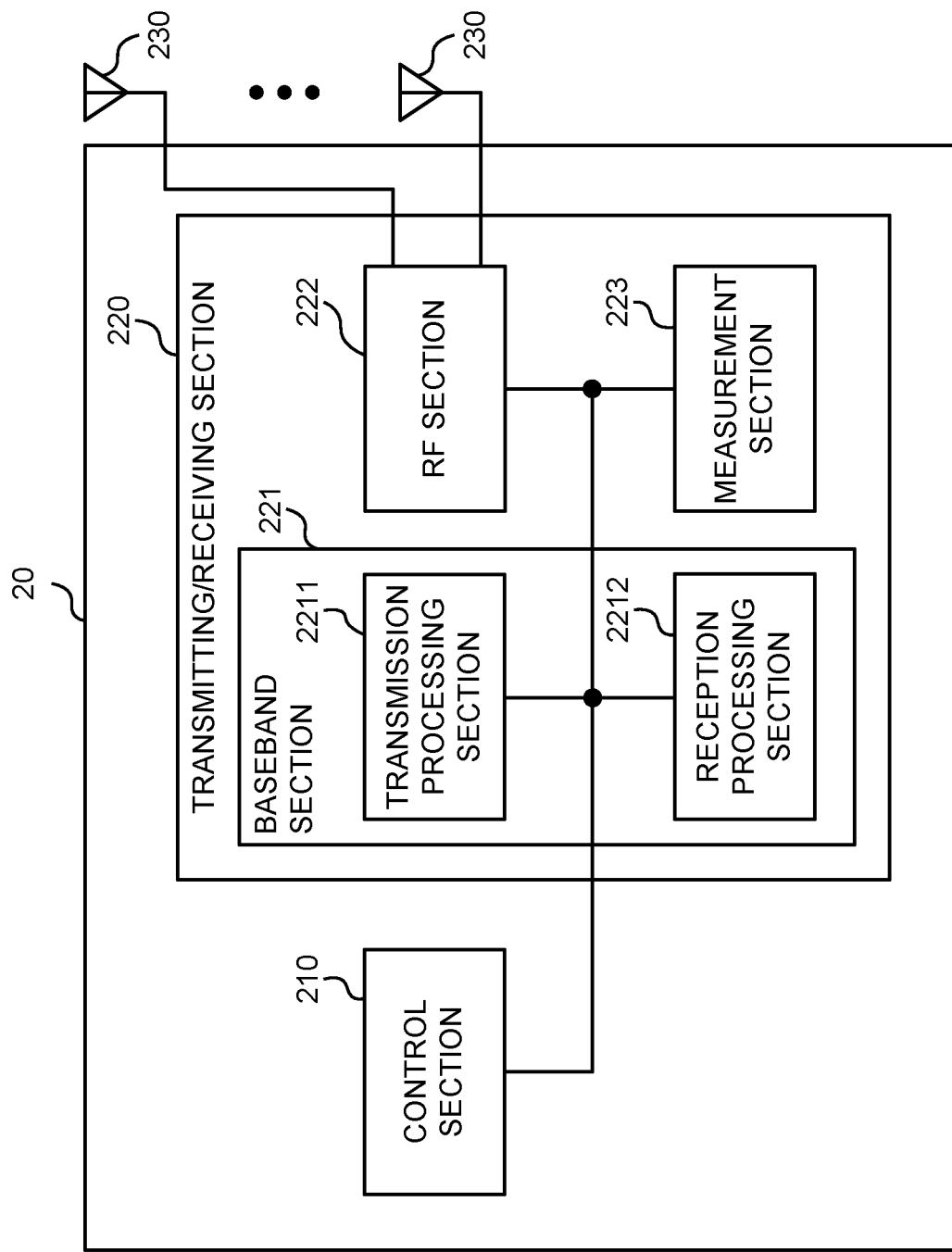
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

Note that the transmitting/receiving section 220 receives downlink control information. The transmitting/receiving section 220 may transmit an uplink signal (for example, an uplink shared channel), and receive a downlink signal (for example, a downlink shared channel). The transmitting/receiving section 220 receives configuration information (SS configuration information) of a search space set. The transmitting/receiving section 220 may receive configuration information (for example, UE-specific PDCCH information or cell-specific PDCCH information) of a downlink control channel.

The control section 210 may control monitoring of downlink control information (DCI) of a first format (for example, DCI format 0_2) other than formats 0_0 and 0_1 used for scheduling of an uplink shared channel and a second format (for example, DCI format 1_2) other than formats 1_0 and 1_1 used for scheduling of a downlink shared channel in the search space set configured based on the configuration information (first aspect).

The configuration information may include information for specifying one of the formats 0_0 and 1_0, the formats 0_1 and 1_1, and the first and second formats as a format of the DCI monitored in the search space set (for example, FIGS. 2 and 4).

The configuration information may be for a specific search space set for monitoring the first and second formats (for example, FIG. 3), or for the user terminal 20 in which monitoring of the first and second formats is assumed (for example, FIG. 4).

The control section 210 may determine priority of the search space set, based on at least one of an ID of the search space set and whether or not the first and second formats are monitored in the search space set (third aspect).

The control section 210 may control monitoring of a third DCI format (for example, DCI format 2_4) including an indication of uplink preemption in the search space set configured based on the configuration information (second aspect).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
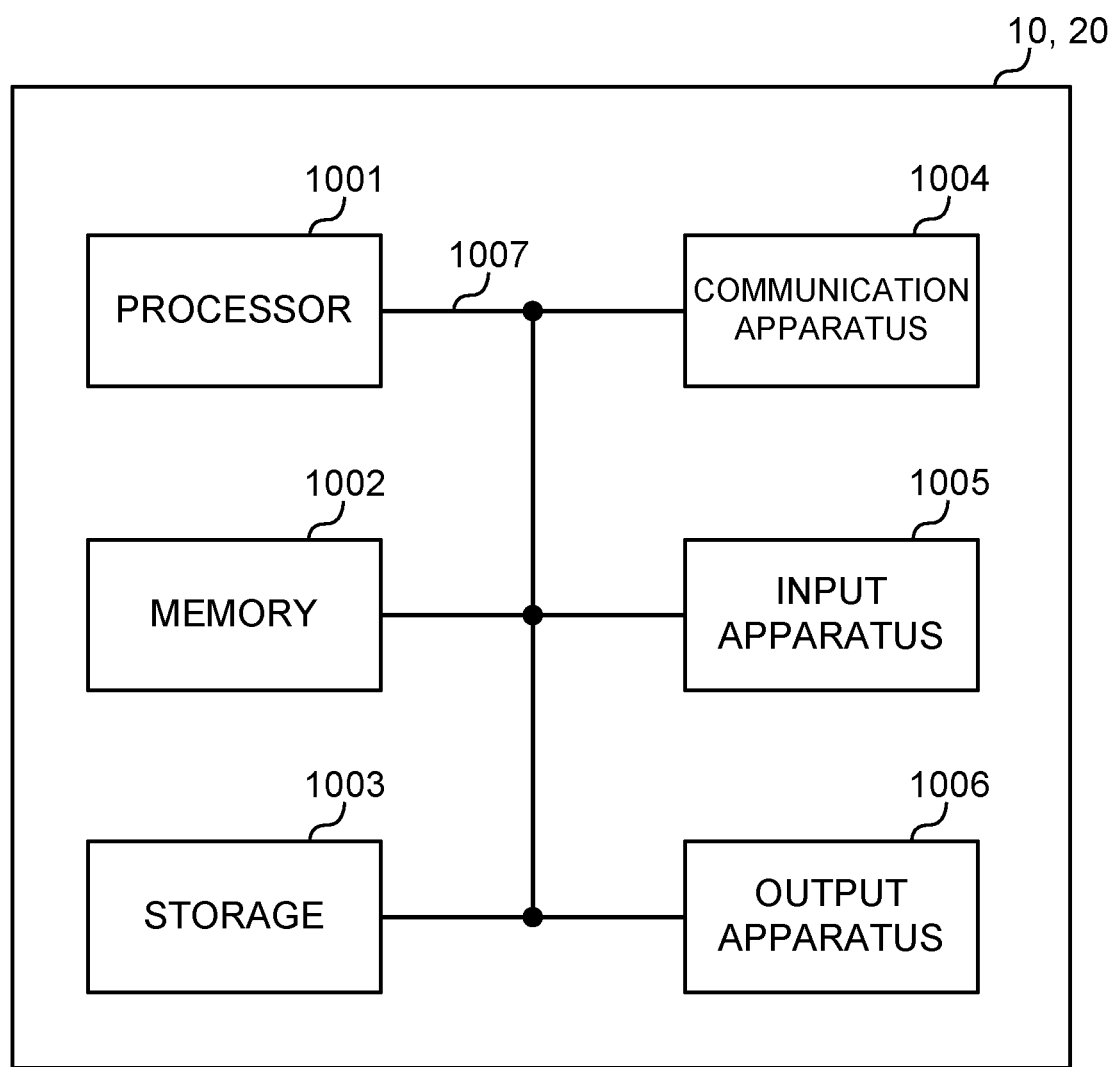
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiving section that receives configuration information of a search space set; and
a control section that controls monitoring, in the search space set, of at least one of a first downlink control information (DCI) format used for scheduling of an uplink shared channel and a second DCI format used for scheduling of a downlink shared channel, based on at least one of an ID of the search space set and a type of the search space set,
wherein the first DCI format is other than DCI formats 0_0 and 0_1, and the second DCI format is other than DCI formats 1_0 and 1_1,
wherein the control section determines that for the type of the search space set, the monitoring in a common search space set (CSS) is prioritized over a UE-specific search space set (USS), and
wherein the type of the search space set has priority over the ID of the search space set.

2. The terminal according to claim 1, wherein the control section controls monitoring, in the search space set, of at least one of the first DCI format and the second DCI format, based on the ID of the search space set and the type of the search space set.

3. The terminal according to claim 1, wherein the control section determines that the monitoring is prioritized in an ascending order of the ID of the search space set.

4. A radio communication method for a terminal, comprising:
receiving configuration information of a search space set; and
controlling monitoring, in the search space set, of at least one of a first downlink control information (DCI) format used for scheduling of an uplink shared channel and a second DCI format used for scheduling of a downlink shared channel, based on at least one of an ID of the search space set and a type of the search space set,
wherein the first DCI format is other than DCI formats 0_0 and 0_1, and the second DCI format is other than DCI formats 1_0 and 1_1,
wherein the terminal determines that for the type of the search space set, the monitoring in a common search space set (CSS) is prioritized over a UE-specific search space set (USS), and
wherein the type of the search space set has priority over the ID of the search space set.

5. A base station comprising:
a transmitting section that transmits configuration information of a search space set; and
a control section that controls to monitor, in the search space set, at least one of a first downlink control information (DCI) format used for scheduling of an uplink shared channel and a second DCI format used for scheduling of a downlink shared channel, based on at least one of an ID of the search space set and a type of the search space set, in a terminal,
wherein the first DCI format is other than DCI formats 0_0 and 0_1, and the second DCI format is other than DCI formats 1_0 and 1_1,
wherein the control section determines that for the type of the search space set, the monitoring in a common search space set (CSS) is prioritized over a UE-specific search space set (USS), and
wherein the type of the search space set has priority over the ID of the search space set.

6. A system comprising a terminal and a base station, wherein:
the terminal comprises:
a receiving section that receives configuration information of a search space set; and
a control section of the terminal that controls monitoring, in the search space set, of at least one of a first downlink control information (DCI) format used for scheduling of an uplink shared channel and a second DCI format used for scheduling of a downlink shared channel, based on at least one of an ID of the search space set and a type of the search space set,
wherein the control section determines that for the type of the search space set, the monitoring in a common search space set (CSS) is prioritized over a UE-specific search space set (USS), and
wherein the type of the search space set has priority over the ID of the search space set, and
the base station comprises:
a transmitting section that transmits the configuration information; and
a control section of the base station that controls to monitor, in the search space set, at least one of the first DCI format and the second DCI format based on at least one of the ID of the search space set and the type of the search space set, in the terminal, wherein the first DCI format is other than DCI formats 0_0 and 0_1, and the second DCI format is other than DCI formats 1_0 and 1_1.

7. The terminal according to claim 2, wherein the control section determines that the monitoring is prioritized in an ascending order of the ID of the search space set.

* * * * *